United States Patent

Harris

[11] 3,909,741
[45] Sept. 30, 1975

[54] ACOUSTIC TRANSDUCER WITH DIRECT CURRENT OUTPUT

[75] Inventor: Lawrence A. Harris, Schenectady, N.Y.

[73] Assignee: General Electric Company, Schenectady, N.Y.

[22] Filed: Nov. 4, 1974

[21] Appl. No.: 520,568

[52] U.S. Cl. .................... 330/5.5; 310/8.1; 310/9.8
[51] Int. Cl.² ........................................ H03F 3/04
[58] Field of Search ............... 330/5.5; 310/8.1, 9.8

[56] References Cited
UNITED STATES PATENTS
3,406,350   10/1968   Newell ............................. 330/5.5

Primary Examiner—R. V. Rolinec
Assistant Examiner—Darwin R. Hostetter
Attorney, Agent, or Firm—Jack E. Haken; Joseph T. Cohen; Jerome C. Squillaro

[57] ABSTRACT

An acoustic transducer which produces a direct current output signal suitable for capacitive storage is described. Incident acoustic energy is converted to a surface wave in a piezoelectric rod. A first slab of semiconductor material lying in close proximity to the surface of the rod forms a traveling wave amplifier. Energy is coupled from the amplifier bias circuit to the surface wave. A second slab of semiconductor material lying proximate to the piezoelectric rod forms a traveling wave attenuator. Energy coupled from the surface wave to the attenuator changes the conductivity of the second semiconductor slab. Direct current flow in the attenuator bias circuit varies in proportion to the incident acoustic wave intensity.

In a second embodiment a reference surface wave is mixed with the output of the traveling wave amplifier. The piezoelectric rod is stressed into a non-linear region producing a direct current output signal which is proportional to the intensity of the incident acoustic energy.

15 Claims, 5 Drawing Figures

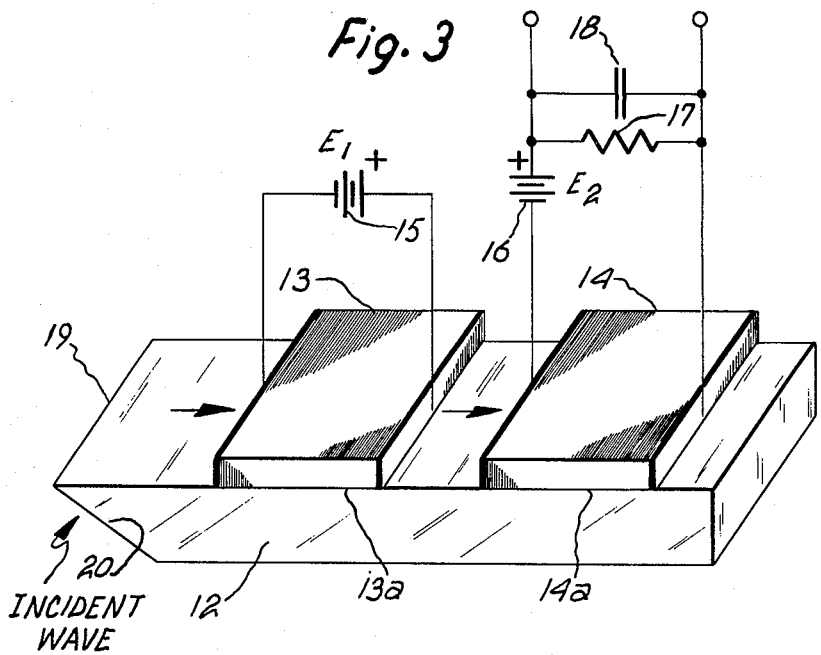
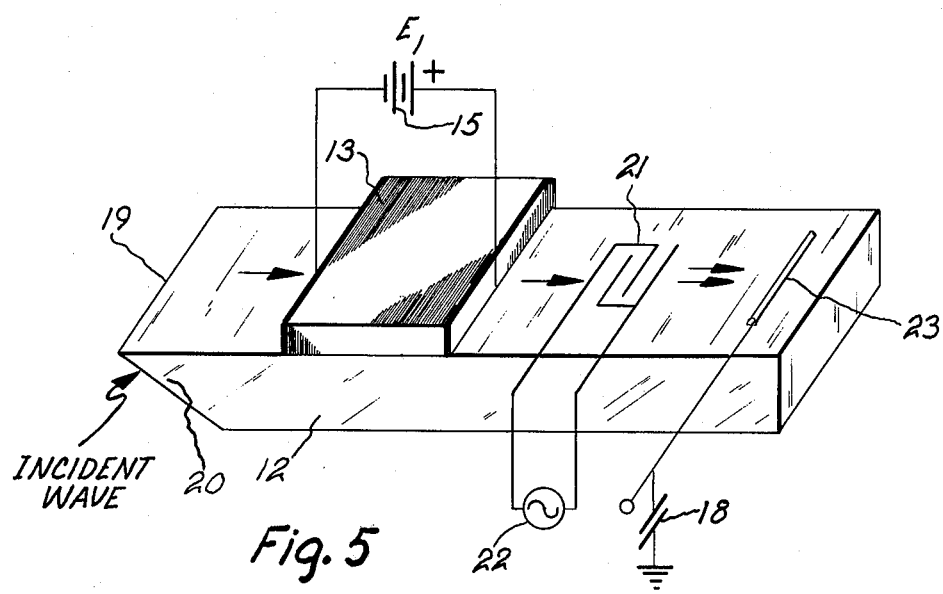

ACOUSTIC TRANSDUCER WITH DIRECT CURRENT OUTPUT

BACKGROUND OF THE INVENTION

This invention relates to transducers for the detection of acoustic energy. More specifically, this invention relates to an ultrasonic transducer which produces changes in direct current output in response to changes in the intensity of a detected wave.

Imaging systems utilizing acoustic energy are widely used in medical and industrial applications. In a typical system, a pulse of acoustic energy is directed into an object under observation. Spatial variations in the transmissive properties of the object reflect energy in various degrees. This energy may be gathered in a detector and used to produce images of the reflecting structure.

Inspection systems using this principle find application in nondestructive testing of machine parts and castings. In a medical setting, they can be used for the diagnosis of tumors, prenatal examination, and diagnosis of structural abnormalities in soft tissue.

One class of acoustic imaging devices utilizes a spatial array of separate acoustic transducers to generate display information. In such a system it is often desirable to store the transducer output signals until they can be interrogated and transferred at a speed compatible with a display device. Prior art systems have stored this information as, for example, digital data. Capacitive storage of these signals in analog form is desirable because of its low cost and ease of construction. However, prior transducers generated alternating current output signals which required electronic processing to make them compatible with this mode of storage.

Ultrasonic traveling wave amplifiers are suitable means for the transfer of energy to an acoustic wave in a piezoelectric body. An electric field is applied to a semiconductor lying in close proximity to the body surface; the magnitude and direction of the field being adjusted to cause charge carrier flow in the same direction as the propagating acoustic wave. The electric field associated with the propagating wave in the piezoelectric body causes bunching of the moving charge carriers. Amplification of the acoustic wave will result if the drift velocity of the carriers is slightly greater than the propagation velocity of the acoustic wave. The electric field produced by the amplified wave may be sensed by a suitable structure at the output end of the piezoelectric device. Various embodiments of this piezoelectric-semiconductor traveling wave amplifier have been described in publications; for example U.S. Pat. No. 3,388,334. These devices all produce alternating current electrical outputs and for that reason have been less than satisfactory for use in acoustic imaging arrays of the class described. Since alternating current outputs are generally unsuitable for storage and later interrogation by a display system, each element of an array utilized in such a system required a separate electronic circuit for converting and storing its alternating current output as a direct current signal.

It is well known that the traveling wave amplifier device described above may be operated with a charge carrier drift velocity slightly less than that of the propagating acoustic wave. Such a device functions as an acoustic attenuator and has been used as such in the prior art.

SUMMARY OF THE INVENTION

This invention utilizes combined traveling wave amplifier and attenuator structures to detect an acoustic wave and produce a direct current output which is suitable for capacitive storage and later interrogation by an electron beam or other scanning device. Incident acoustic energy is directed into one end of a rod of piezoelectric material and is converted into a surface wave by a mode converter wedge, Brewster angle cut, or other means known to the art. A first slab of semiconductor material is placed proximate to the rod near the input end. An electric field is applied to the semiconductor in the direction of the acoustic surface wave propagation with sufficient magnitude to cause amplification of that wave. The rod extends beyond this first semiconductor slab and the amplified acoustic wave continues to propagate in that direction. A second semiconductor slab is proximate to the rod above the path of propagation of the amplified acoustic wave. An electric bias potential applied to the second slab in the direction of the propagating wave causes a current flow in the second semiconductor slab which is selected to produce a carrier drift velocity slightly less than the propagation velocity of the acoustic wave. In this mode the second semiconductor slab functions as an acoustic attenuator wherein energy is transferred from the propagating wave to the drifting charge carriers. A manifestation of this energy transfer is a change in the conductivity of the second slab and resulting voltage and current variations in its bias circuit. These direct current level changes, which are proportional to the intensity of the incident acoustic wave, are coupled to a storage capacitor for later interrogation by a scanning circuit.

A second embodiment of the invention utilizes a piezoelectric rod and first semiconductor slab structure as described above. The rod again extends beyond the first semiconductor slab where a surface wave launcher of any conventional type, is used to introduce propagation of a second, reference, wave at the signal frequency. The gain of the first amplifier section and the magnitude of the reference acoustic wave are selected to be of sufficient magnitude to stress the piezoelectric material into a region of nonlinear electrical response. As the two acoustic waves propagate through the now nonlinear piezoelectric medium, an electrical mixing occurs. The output frequencies of the mixed signals include a d-c component of energy transferred from the amplifier and reference wave which may be detected by a wire placed across the slab perpendicular to the direction of acoustic propagation.

The individual structural components of this invention have been generally described in prior literature. The new and novel features are the combination of these structures in a single transducer which produces a direct current output proportional to the intensity of an incident acoustic wave.

It is therefore an object of this invention to provide an acoustic transducer having an integral traveling wave amplifier and producing a direct current output with variations proportional to variations in the intensity of an incident acoustic wave.

It is another object of this invention to provide an acoustic transducer which generates a direct current output by using a surface wave to couple energy between multiple traveling wave circuits.

Yet another object of this invention is to provide a piezoelectric acoustic transducer which transfers energy from a traveling wave source to a direct current output circuit by mixing acoustic waves in a nonlinear medium.

BRIEF DESCRIPTION OF THE DRAWINGS

FIG. 3 is an alternate embodiment of the detector of FIG. 1 utilizing a Brewster angle wave projector.

FIG. 5 is an alternate embodiment of the detector of FIG. 4 utilizing a Brewster angle wave projector.

DESCRIPTION OF THE PREFERRED EMBODIMENTS

Figure 1:
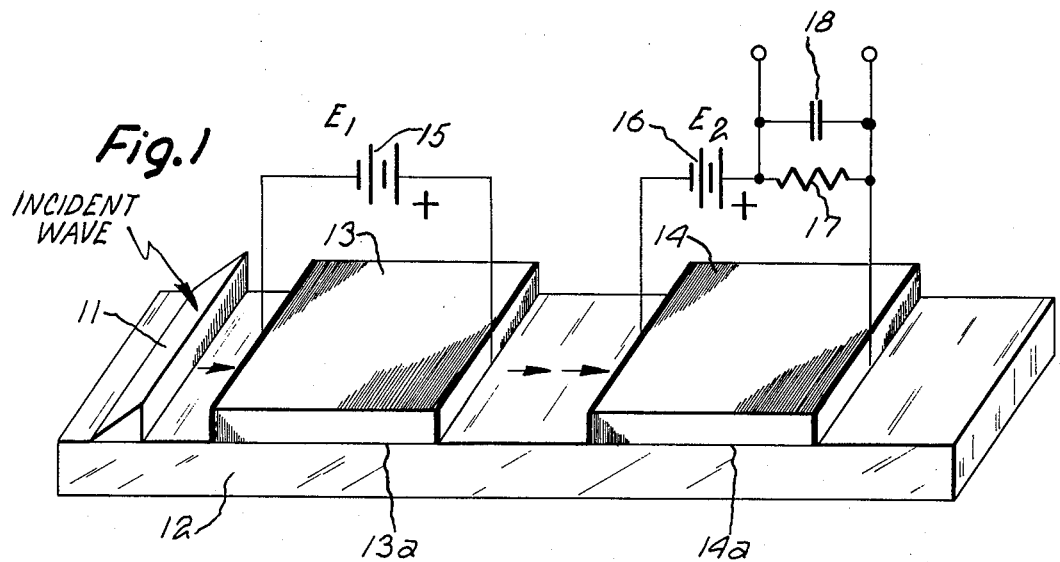
FIG. 1 is an embodiment of the invention wherein energy is coupled from a traveling wave amplifier to a traveling wave attenuator.

In the embodiment of FIG. 1 an incident acoustic wave is converted from the bulk compression mode to a surface mode by the wedge converter 11. The surface wave propagates from left to right in the drawing along a flat rod of piezoelectric material 12 which may be quartz, lithium niobate, bismuth germanium oxide, or any other material commonly known or used in the art. A first slab of semiconductor material 13 which may be of any known type but which for the sake of clarity of description will hereinafter be referred to as n-silicon is placed in proximity, but not acoustically bonded, to the surface of the rod above the path of the propagating surface wave. The rod extends beyond this slab in the direction of propagation at which point a second slab of semiconductor material 14 is similarly placed. A first bias voltage source 15 impresses an electric field across the first silicon slab 13 in the direction of the surface wave propagation. The potential of this voltage source, $E_1$, is selected so that the drift velocity of electrons in the first slab is slightly greater than the velocity of propagation of the surface wave in the piezoelectric rod. As the surface wave propagates beneath the first silicon slab it produces local electric field variations at the interface of the silicon with the piezoelectric material. These traveling electric fields interact with the drift electrons in the silicon in a manner which acts to transfer energy from the electrons to the wave.

This surface wave of increased intensity continues on a path under the second silicon slab 14. A second bias voltage source 16 applies an electric field to the second slab 14 causing electron drift in the direction of the propagating wave. The potential of that voltage source $E_2$ is chosen so that the electron drift velocity within the second silicon slab is slightly less than the propagation velocity of the surface wave below that slab. Resistor 17 is connected in series with the second voltage source 16 and the second silicon slab 14 so that the potential drop across the resistor 17 is proportional to the current flow through silicon slab 14. Capacitor 18, connected in parallel with the resistor 17, serves to store values of the potential generated across that resistor.

As the surface wave travels beneath the second slab 14, the electric field associated with the wave interacts with the drift electrons in the slab and transfers energy to them. This transferred energy manifests itself as an increase in the electrical conductivity of the silicon slab and results in an increase in the current flow from the second source 16. This current flow increases the voltage drop across the resistor 17 and capacitor 18, the value of which is stored for later interrogation by an electron beam or scanning circuit, (not shown).

Figure 2:
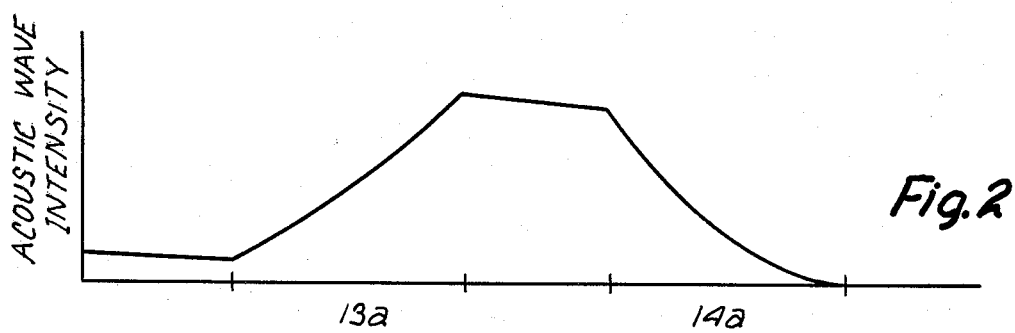
FIG. 2 is a graphical representation of the acoustic wave intensity in the transducer of FIG. 1 as a function of position on the transducer.

Referring to FIG. 2, which indicates the acoustic wave intensity within the piezoelectric rod 12 at displacements corresponding to those in FIG. 1, it may be seen that the acoustic wave intensity increases in the region 13a beneath the first slab 13 as energy is transferred from electrons within the slab to the wave. This energy is transferred back to the electrons within the second slab 14 resulting in a decrease in the acoustic wave intensity in the region 14a below slab 14.

The magnitude of the surface wave in the region 14a under the second slab is proportional to the product of the intensity of the wave entering the region under the first slab 13 and a gain factor which is dependent upon the geometry and circuit factors associated with the first slab. For a given set of circuit and structure parameters, the output voltage is proportional to the amplitude of the acoustic wave impinging on the mode converter wedge 11.

In FIG. 3 the input end 19 of piezoelectric rod 12 is cut to form a Brewster angle 20. Bulk compression waves impinging on this end are converted to surface waves on the rod, eliminating the converter wedge 11 of FIG. 1.

The direct current signal provided at the output of this device is suitable for immediate capacitive storage. Energy is transferred from the first bias voltage source 15 to the storage capacitor 18 thereby providing a high level output.

Figure 4:
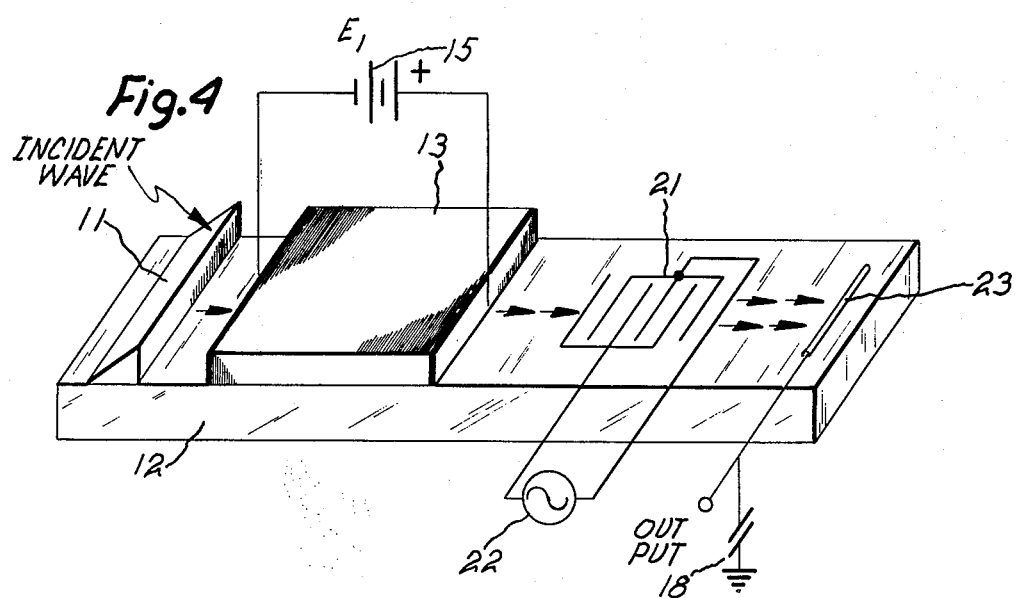
FIG. 4 is another embodiment of the invention wherein the direct current output is generated by the interaction of two acoustic waves in a nonlinear piezoelectric medium.

Another embodiment of the invention illustrated in FIG. 4, utilizes a piezoelectric rod 12 with a mode converter 11, first semiconductor slab 13, and bias voltage source 15 as described above. A wave launcher 21 is located on the surface of the rod in the path of the amplified surface wave as it emerges from beneath the semiconductor slab. Source 22 produces a reference sonic voltage which is applied to the launcher and causes a second high amplitude reference surface wave to propagate along the rod surface together with the amplified surface wave. The amplitudes of the propagating surface waves and the characteristics of the rod in the region to the right of the launcher are chosen, using methods well known in the art, to produce a nonlinear mixing of the reference wave with the amplified surface wave. This mixing produces harmonic components at the frequencies of interaction of the waves. If the reference and signal frequencies are equal a direct current component is generated on the rod. A sensor wire 23 attached to the surface of the rod detects this voltage which is then stored on a capacitor 18.

FIG. 5 is a modification of the device of FIG. 4 in which a Brewster angle converter 20 is substituted for the converter wedge 11.

This device transfers energy from the bias and reference voltage sources 15 and 22 to a direct current output signal. An output suitable for direct capacitive storage is produced.

The transducer of this invention thus allows construction of detector arrays which, through use of simple capacitive storage elements eliminates the need for many of the electronic circuits that were necessary to display the sound field intensity in the prior art.

While this invention has been described with respect to specific embodiments and examples, other structures and modifications will be apparent to those skilled in the art. Therefore, by this disclosure it is intended to include all those modifications and embodiments which fall within the spirit and scope of the appended claims.

The invention claimed is:

1. A transducer for the production of a direct current electrical signal in response to incident acoustic energy; comprising in combination:
   a flat rod of piezoelectric material propagative of acoustic surface waves;
   means for collecting energy from incident acoustic waves and projecting said energy, as a surface wave of known velocity, along a predetermined path on the surface of said rod;
   a first slab of semiconductor material placed proximate the surface of said rod above the path of said surface wave;
   a first source of direct current electric potential connected to said first slab to produce a charge carrier flow within said slab in the direction of said path, the magnitude of said first potential being selected to establish a charge carrier drift velocity greater than said surface wave velocity, whereby energy is transferred to said surface wave; and
   extracting means for converting said transferred energy to a direct electrical current output signal.

2. The transducer of claim 1 wherein the extracting means comprises:
   a second slab of semiconductor material placed proximate to the surface of said rod above the path of said surface wave beyond the point at which said path emerges from under said first slab;
   a second source of direct current electric potential, connected to said second slab to produce a charge carrier flow within said second slab in the direction of said path, the magnitude of said second potential being selected to establish a charge carrier drift velocity in said second slab less than said surface wave velocity; and
   means for determining changes in the electrical conductivity of said second slab and producing said output signal in response to changes thereof.

3. The transducer of claim 2 wherein the semiconductor slabs are layers of n-silicon.

4. The transducer of claim 2 wherein the piezoelectric rod is chosen from the group of materials consisting of quartz, lithium niobate, and bismuth germanium oxide.

5. The transducer of claim 2 wherein one end of said rod forms a Brewster angle with a surface of said rod and wherein said end comprises the energy collecting and projecting means.

6. The transducer of claim 2 wherein the energy collecting and projecting means comprises a converter wedge.

7. The transducer of claim 2 wherein the conductivity determining means comprises a resistor connected in series with the second potential source and the second semiconductor slab.

8. The transducer of claim 7 further comprising:
   a capacitive element for the storage of the potential developed on said resistor.

9. The transducer of claim 1 wherein the extracting means comprises:
   means for launching a second surface wave along the path of said first surface wave from a point beyond that at which said first surface wave emerges from under said slab, the intensity of said second wave being sufficiently large to stress said rod into the region of nonlinear piezoelectric response on the common path of propagation of said waves; and
   means for detecting direct current electrical potential on said common path.

10. The transducer of claim 9 where the semiconductor slab is a layer of n-silicon.

11. The transducer of claim 9 where the piezoelectric material is chosen from the group of materials consisting of quartz, lithium niobate, and bismuth germanium oxide.

12. The transducer of claim 9 where one end of the piezoelectric rod forms a Brewster angle with a surface of said rod, said end comprising the collecting and projecting means.

13. The transducer of claim 9 wherein said collecting and projecting means comprises a mode converter wedge.

14. The transducer of claim 9 wherein the potential sensing means comprises a metallic wire fastened to the surface of said rod perpendicular to the common path of propagation of said surface waves.

15. The transducer of claim 14 further comprising a capacitive element connected between said wire and a reference ground potential.

* * * * *